Figure 1:
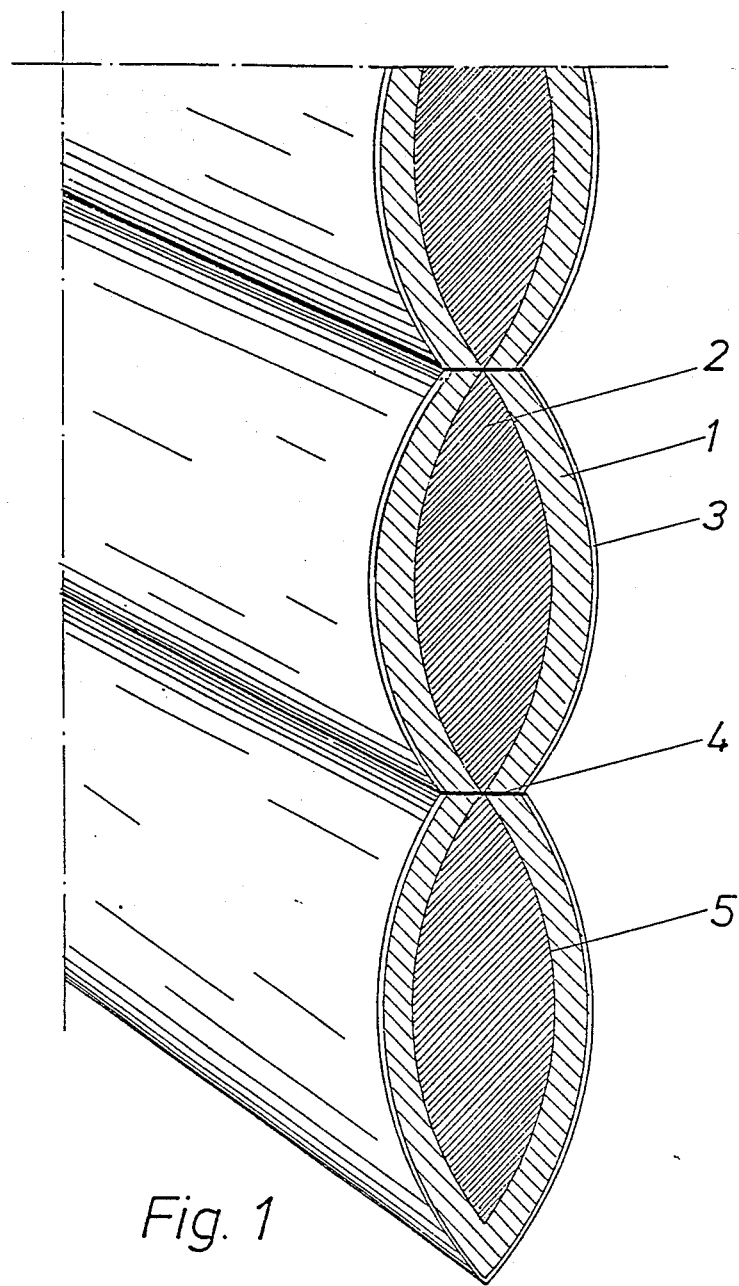

United States Patent [19]

Jacobsen

[11] Patent Number: 4,748,768
[45] Date of Patent: Jun. 7, 1988

[54] METHOD FOR THE PRODUCTION OF A MATTRESS

[76] Inventor: Poul E. B. Jacobsen, Ørneborgvej 27, 8900 Randers, Denmark

[21] Appl. No.: 942,547

[22] Filed: Dec. 9, 1986

Related U.S. Application Data

[63] Continuation of Ser. No. 629,785, Jun. 27, 1984, abandoned.

[30] Foreign Application Priority Data

Nov. 23, 1982 [DK] Denmark .............................. 5204/82
Nov. 22, 1983 [CA] Canada .................................. 441646
Nov. 23, 1983 [ES] Spain ...................................... 527479

[51] Int. Cl.⁴ .............................................. B65B 1/04
[52] U.S. Cl. ......................................... 53/428; 5/481; 53/473; 53/438
[58] Field of Search ................. 53/438, 521, 524, 428, 53/431, 111 R, 473; 5/481, 502

[56] References Cited

U.S. PATENT DOCUMENTS

| Re. 16,283 | 3/1926 | Mitchell ............................ 53/521 |
| 2,256,939 | 9/1941 | Copeland . |
| 2,725,927 | 12/1955 | Feinerman . |
| 3,242,508 | 3/1966 | Smithson ............................ 5/502 |
| 3,459,179 | 8/1969 | Olesen ............................... 5/481 |
| 3,576,784 | 4/1971 | Grove et al. ..................... 53/521 |

FOREIGN PATENT DOCUMENTS

| 34793 | 7/1925 | Denmark .............................. 53/524 |
| 121398 | 10/1971 | Denmark . |
| 283960 | 7/1913 | Fed. Rep. of Germany . |
| 1084883 | 7/1960 | Fed. Rep. of Germany . |
| 1554031 | 11/1969 | Fed. Rep. of Germany . |
| 1529382 | 12/1969 | Fed. Rep. of Germany . |
| 2307938 | 8/1974 | Fed. Rep. of Germany . |
| 2440183 | 3/1976 | Fed. Rep. of Germany . |
| 369557 | 7/1963 | Sweden . |

Primary Examiner—Robert L. Spruill
Assistant Examiner—Donald R. Studebaker
Attorney, Agent, or Firm—Merchant, Gould, Smith, Edell, Welter & Schmidt

[57] ABSTRACT

A mattress consists of two outer layers of cotton material (3), under which there is provided two layers of plastic foam material (1), in that these four layers are sewn together with stitching (4) in such a manner that there are formed compartments or channels which can be filled with particles of synthetic material (2). Such a mattress is capable at one and the same time of dissipating moisture while keeping the body warm by insulation, while simultaneously influencing the body with an advantageous massaging effect which, among other things, prevents bedsores and the like.

2 Claims, 2 Drawing Sheets

METHOD FOR THE PRODUCTION OF A MATTRESS

This is a continuation of application Ser. No. 629,785, filed June 27, 1984, now abandoned.

The invention relates to a mattress consisting of several layers of insulating material, said mattress being divided up into compartments or channels.

Such mattresses are often used to increase the sleeping comfort, and it is also known that patients with back pains can derive great benefit from such mattresses which provide both a curing and/or an alleviating effect with regard to such ailments.

Several mattresses of this kind are already known. From the Danish Pat. No. 121 398, for example, there is known a pillow with a filling of small, rounded particles of plastic material and a soft covering of gauze-like material. The same patent also describes pillows with a filling of comminuted polystyrene foam. From the German publication No. 2 307 938 there is known a seating underlayer which consists of a filling material of balls of plastic foam or the like and a covering of nylon weave. A similar pillow is known from German publication No. 2 311 054, this having a covering of textile material.

These known mattresses all have one specific object. The object of the pillow according to the Danish patent No. 121 398 is thus to prevent bedsores by providing a massage effect. The seating underlayer according to the German publication No. 2 307 938 is described as having a heat-insulating effect and is used, for example, together with car seats.

Finally, the pillow according to the German publication No. 2 311 054, for reasons of its heat-insulating effect, is also intended for use with the object of preventing possible sufferings in connection with colds.

Each of these known constructions are excellently suited for fulfilling the appointed tasks, but are not expedient for daily use as sleeping underlayers. The reason is that in daily use there arise either problems of humidity, the lack of massage effect or problems with drying-out of the skin.

The object of the present invention is thus to provide a mattress which has the combined effect of holding the body at a suitable temperature without consumption of energy while allowing the sweat which is formed to be effectively ventilated away, and at the same time for said mattress to be capable of producing a massaging action.

This object is achieved according to the invention by the combination of: An upper and a lower layer consisting of porous plastic foam material, a layer of insulating particles of synthetic material enclosed between these layers, and a covering of material surrounding the mattress.

The mattress according to the invention has proved to have an insulating effect without problems of humidity, so that the body is held at a suitable temperature. Moreover, the mattress distributes the pressure of the body against the underlayer in an expedient manner, and the mattress according to the invention is therefore comfortable to lie on. The effect of the mattress is at the same time circulation-promoting and massaging on the body, which counteracts bedsores and other inconveniences connected with longer periods of sickbed care.

These advantageous effects can be assumed to lie in the fact that the combination of plastic foam layers and particles of synthetic material provides a suitable ventilation through the mattress itself, while still being suitably heat-insulating, so that the body is neither cooled nor overheated. Furthermore, the movement of the particles in relation to one another provide an expedient massaging action, this being further intensified by the dividing up into compartments.

If the particles of synthetic material are round, as presented in claim 2, the mattress achieved is easy to fill and comfortable to lie on.

As presented in claim 3, it can be expedient for the synthetic-particles to be produced from polystyrol. The mattress is thus given good characteristics by means of a relatively cheap material.

As presented in claims 4 and 5, a mattress according to the invention can be characterized by the plastic foam material being polyether, and especially polyether having an impression strength of 145 N at 40% impression. This material has proved to have excellent ventilating and insulating properties, and at the same time to have good supporting characteristics.

If the mattress has transverse channels, as presented in claim 6, it is easy to fill and the mattress can easily be rolled together.

Finally, the mattress has shown to be given good characteristics if the width of the channels in the pressed flat condition is approx. 10 cm and, as presented in claims 7 and 8, if the thickness of the plastic foam layers is at least 5 mm.

The invention also relates to a method of producing a mattress according to the invention, said method being characterized in that two layers of plastic foam material and two layers of covering material are sewn together in such a way that they form a mattress-like part with channels, each of which are provided with an opening, and that either individually or simultaneously the channels are filled with particles of synthetic material, said filling being effected from the bottom of the channels and progressively towards the channels' openings, after which the openings are sewn together to form the finished mattress.

This has proved to be a simple and expedient method which results in a good and uniform filling of all the mattress's channels.

If, as presented in claim 10, one fills the channels through one or more tubes, and during the filling the tubes are moved out of the channels from the bottom towards the opening, a very uniform and quick filling is achieved in a simple manner.

Because of the friction between the synthetic filling and the tube, the filling can easily be statically charged, which results in irregular filling. As presented in claim 11, this can be avoided by adding an anti-static agent to the synthetic particles before the filling process.

The method according to the invention can be further characterized by the addition of a starch-containing powder to the synthetic particles, which has also proved to considerably reduce the problems with static electricity. As presented in claim 13, this powder can be potato flour.

Finally, the invention also relates to a tool for the execution of the method, said tool being characteristic in that it comprises one or more filling tubes having a length which at least corresponds to the depth of the channels to be filled.

By inserting such tubes down into the channels in the mattress to the bottom of said channels, and thereafter filling these with synthetic particles while withdrawing the tubes out of the channels, one can achieve a uniform and quick filling of the channels.

If the cross-section of the tubes is elongated, as presented in claim 15, a further uniform filling is achieved which is facilitated even more if the tubes are provided with a funnel as presented in claim 16.

If the tool is designed as presented in claim 17, an easy dosing is achieved, and if the tubes are made of stainless steel, one can reduce the problem of static electricity while at the same time avoiding discolouring of the mattress by smudging from the tubes.

Figure 2:
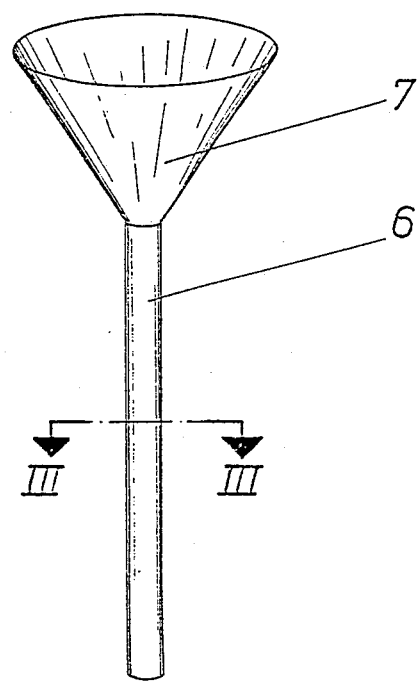
Figure 3:
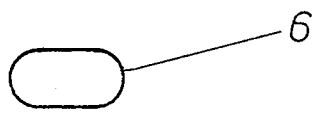

The invention will now be described in more detail with reference to the drawing, where FIG. 1 shows a section through a part of a mattress according to the invention, FIG. 2 shows a tool according to the invention, and FIG. 3 shows a section through the tool from FIG. 2, seen in the direction of the arrows along the line III—III.

In FIG. 1 can be seen a part of the mattress according to the invention. On the outside and on both sides the mattress has a covering 3 of a material which, from the point of view of expediency, can be cotton. Immediately under this layer of material there are provided two layers of porous plastic foam 1. It is expedient for these to consist of polyether, but other materials can also be envisaged. These four layers are sewn together at intervals with stitching 4, the result being long channels along the whole of the mattress's breadth. These channels are filled with particles of synthetic material 2 which, for example, can be balls of polystyrol, but also here other synthetic materials can be envisaged.

The mattress is filled with the balls by means of the filling tool 6, 7. It is possible for several of such tools to be used simultaneously, each in their own channels. Each tool 6,7 consists of a filling tube 6 having a length which corresponds approximately to that of the channels. Moreover, the tube 6 has an elongated cross-section. These tubes provide a good and uniform filling of the channels if the tube 6 is gradually withdrawn from the channel as the filling progresses.

Each tube is provided with a funnel-shaped part 7. If several tubes are used at the same time, the tubes can possibly be provided with a common funnel. The volume of the funnel-shaped part 7 can be dimensioned so that together with the volume of the tube 6, it corresponds to the volume of the amount of balls needed to fill each channel. It is expedient for the tube 6 to be made of stainless steel, in that other metals which have been tried have proved to sully the mattress when being withdrawn. Moreover, stainless steel is electrically conductive, which reduces the problems connected with static electricity. These problems can be further reduced by mixing the synthetic particles with potato flour before the filling is carried out.

It will be obvious that a mattress according to the invention can be formed in many different ways. For use as a roll mattress for a single person, the preferred embodiment is one in which the mattress measures approx. 80 cm in breadth, 190 cm in length and 3 cm in the thickness. Moreover, the preferred mattress has transverse channels which are approx. 10 cm wide in the pressed flat condition. The degree of filling of the channels can be varied all depending on the degree of hardness that the finished mattress is desired to have.

The mattress according to the invention can be made of materials other than polystyrol and polyether, but this precise combination of materials has proved to give the mattress the desired characteristics.

It will be possible, of course, for anyone skilled in the art to use the tool according to the invention as a part of a more or less automated apparatus for the filling of the mattress.

Finally, it can be added that the part of an embodiment seen in the drawing is shown on a scale of 1:1.

I claim:

1. A method of producing a mattress having two layers of covering material formed to define longitudinal channels with one open end and one closed end for receiving synthetic particles therein by means of a long tubular member, comprising the steps of:
   (a) mixing an anti-static agent with the synthetic particles;
   (b) inserting the tubular member into the channel and to the closed end thereof; and
   (c) filling the channel with particles and antistatic agent by progressively withdrawing the tubular member as the channel is filled from the bottom to the top end.

2. A method according to claim 1 wherein said mixing step includes mixing potato flour with the synthetic particles as an anti-static agent.

* * * * *